(12) United States Patent
Papasakellariou et al.

(10) Patent No.: US 9,198,141 B2
(45) Date of Patent: Nov. 24, 2015

(54) METHOD AND APPARATUS FOR TRANSMISSION POWER CONTROL FOR A SOUNDING REFERENCE SIGNAL

(71) Applicant: Samsung Electronics Co., Ltd., Gyeonggi-do (KR)

(72) Inventors: Aris Papasakellariou, Houston, TX (US); Joon-Young Cho, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 87 days.

(21) Appl. No.: 13/628,907

(22) Filed: Sep. 27, 2012

(65) Prior Publication Data

US 2013/0077571 A1 Mar. 28, 2013

Related U.S. Application Data

(60) Provisional application No. 61/539,701, filed on Sep. 27, 2011.

(51) Int. Cl.
*H04W 52/32* (2009.01)
*H04W 52/18* (2009.01)
*H04W 74/00* (2009.01)

(52) U.S. Cl.
CPC ............ *H04W 52/325* (2013.01); *H04W 52/18* (2013.01); *H04W 74/004* (2013.01); *H04W 74/006* (2013.01)

(58) Field of Classification Search
None
See application file for complete search history.

(56) References Cited

U.S. PATENT DOCUMENTS

| 2009/0046800 | A1  |  2/2009 | Xu et al. |
| 2009/0227278 | A1  |  9/2009 | Cho et al. |
| 2010/0285762 | A1  | 11/2010 | Ko et al. |
| 2011/0098054 | A1* |  4/2011 | Gorokhov et al. ......... 455/452.1 |
| 2011/0292826 | A1* | 12/2011 | Ahn et al. ...................... 370/252 |
| 2011/0306383 | A1* | 12/2011 | Lee et al. ....................... 455/522 |
| 2011/0319121 | A1* | 12/2011 | Jen ................................. 455/522 |
| 2012/0213189 | A1* |  8/2012 | Choi et al. .................... 370/329 |
| 2013/0029657 | A1* |  1/2013 | Gao et al. ................... 455/422.1 |
| 2014/0211767 | A1* |  7/2014 | Lunttila et al. ............... 370/336 |

* cited by examiner

*Primary Examiner* — Ashley Shivers
(74) *Attorney, Agent, or Firm* — The Farrell Law Firm, P.C.

(57) ABSTRACT

A method and apparatus for transmitting a reference signal from a User Equipment (UE) are provided. The method includes transmitting a first reference signal using a sequence determined from an identity of the at least one transmission point and transmitting a second reference signal with a transmission power having an offset with a first maximum value configured by higher layer signaling from the at least one transmission point; and transmitting a first reference signal using a sequence configured to the UE by higher layer signaling from the at least one transmission point and transmitting a second reference signal with a transmission power having an offset with a second maximum value configured by higher layer signaling from the at least one transmission point, wherein the second maximum value is larger than the first maximum value, and the first reference signal and the second reference signal are either identical or non-identical.

20 Claims, 7 Drawing Sheets

METHOD AND APPARATUS FOR TRANSMISSION POWER CONTROL FOR A SOUNDING REFERENCE SIGNAL

PRIORITY

The present application claims priority under 35 U.S.C. §119(e) to U.S. Provisional Application No. 61/539,701 which was filed in the United States Patent and Trademark Office on Sep. 27, 2011, the entire content of which is incorporated herein by reference.

BACKGROUND OF THE INVENTION

1. Field of the Invention

The present invention relates generally to wireless communication systems and, more specifically, to transmission power control of sounding reference signals.

2. Description of the Art

A communication system includes a DownLink (DL) that conveys signals from one or more base stations (NodeBs) to User Equipments (UEs), and an UpLink (UL) that conveys signals from UEs to one or more NodeBs. A UE, also commonly referred to as a terminal or a mobile station, may be fixed or mobile, and may be a device such as a wireless device, a cellular phone, a personal computer device, etc. A NodeB is generally a fixed station and may also be referred to as a Base Transceiver System (BTS), an access point, etc.

A communication system also supports several signal types of transmissions including data signals conveying information content, control signals enabling proper processing of data signals, and Reference Signals (RS), also known as pilots, enabling coherent demodulation of data signals or control signals or providing Channel State Information (CSI) corresponding to an estimate of a channel medium experienced by their transmission.

UL data information is conveyed through a Physical UL Shared CHannel (PUSCH). UL Control Information (UCI) is conveyed through a Physical UL Control CHannel (PUCCH), unless a UE also transmits a PUSCH, in which case the UE may convey at least some UCI in a PUSCH. UCI includes ACKnowledgment (ACK) information associated with a Hybrid Automatic Repeat reQuest (HARM) ACK (HARQ-ACK) process and is transmitted in response to receiving, by a UE, data Transport Blocks (TBs). UCI also includes DL CSI that informs a NodeB of a channel medium experienced by a signal transmission to a UE. An UL RS can be used to demodulate data or control signals, in which case the UL RS is referred to as DeModulation RS (DMRS), or to sound an UL channel medium and provide NodeBs with UL CSI, in which case the UL RS is referred to as Sounding RS (SRS).

DL data information is conveyed through a Physical DL Shared CHannel (PDSCH). DL Control Information (DCI) is conveyed through respective Physical DL Control CHannels (PDCCHs). A PDCCH can convey a Scheduling Assignment (SA) for PUSCH transmission from a UE (UL SA) or for PDSCH reception by a UE (DL SA).

FIG. 1 is a diagram illustrating a conventional PUSCH structure over a Transmission Time Interval (TTI).

Referring to FIG. 1, a TTI includes one subframe 110, which includes two slots. Each slot 120 includes $N_{symb}^{UL}$ symbols used to transmit data information, UCI, or RS. Each symbol 130 includes a Cyclic Prefix (CP) to mitigate interference due to channel propagation effects. The transmission in one slot may be at a same or at a different BandWidth (BW) than the transmission in the other slot. Some PUSCH symbols in each slot may be used to transmit a DMRS 140. The transmission BW includes frequency resource units referred to as Resource Blocks (RBs). Each RB includes $N_{sc}^{RB}$ or Resource Elements (REs). A UE is allocated $M_{PUSCH}$ RBs 150 for a total of $M_{sc}^{PUSCH}=M_{PUSCH} \cdot N_{sc}^{RB}$ REs for a PUSCH transmission BW.

In FIG. 1, the last subframe symbol may be used to transmit SRS 160 from at least one UE. Then, $N_{symb}^{PUSCH}=2 \cdot (N_{symb}^{UL}-1)-N_{SRS}$ subframe symbols are available for data/UCI/DMRS transmissions, where $N_{SRS}=1$ if the last subframe symbol is used to transmit SRS, and $N_{SRS}=0$ otherwise. An SRS transmission from a UE may be sent periodically at predetermined subframes with transmission parameters configured to a UE by higher layer signaling, such as Radio Resource Control (RRC) signaling, or it may be sent aperiodically and triggered by an UL SA or a DL SA.

A PUSCH transmission power is determined so that the associated signals are received with a desired Signal to Interference and Noise Ratio (SINR) at serving NodeBs while controlling interference to neighboring cells thereby achieving reception reliability targets and ensuring proper network operation. Open-Loop (OL) Transmission Power Control (TPC) with cell-specific and UE-specific parameters is typically used together with Closed Loop (CL) corrections through TPC commands from one or more serving NodeBs.

If a PUSCH is scheduled by an UL SA, a respective TPC command is included in the UL SA. If a PUSCH is scheduled according to Semi-Persistent Scheduling (SPS), where a UE is configured by higher layer signaling of a set of parameters for periodic PUSCH transmissions, a TPC command is provided by a separate PDCCH that provides TPC commands to potentially multiple UEs. For each PDCCH, a type of the PDCCH is identified by a scrambling applied to a Cyclic Redundancy Check (CRC) included in a PDCCH codeword. For DL SAs or UL SAs, a CRC is scrambled with a Cell Radio Network Temporary Identifier (C-RNTI). For a PDCCH providing PUSCH TPC commands, a CRC is scrambled by a TPC-PUSCH-RNTI. A PDCCH may also provide PUCCH TPC commands and a respective CRC is then scrambled by a TPC-PUCCH-RNTI. The scrambling operation may be an exclusive OR (XOR) operation, defined by: XOR(0,0)=0, XOR(0,1)=1, XOR(1,0)=1, XOR(1,1)=0.

FIG. 2 is a block diagram illustrating a conventional transmitter block diagram for data in a PUSCH.

Referring to FIG. 2, data bits (and possibly UCI data bits) 210 are provided to a Discrete Fourier Transform (DFT) unit 220 A mapper 230, which performs sub-carrier mapping, maps the output of the DFT unit to REs of a PUSCH transmission BW as indicated by selection unit 240, which controls transmission BW. An Inverse Fast Fourier Transform (IFFT) is subsequently performed by IFFT unit 250, a CP is inserted by CP insertion unit 260 and the resulting signal is filtered by filter 270 for time widowing. Finally, a transmission power ($P_{PUSCH,c}$) is applied by power amplifier (PA) 280 and the resulting signal 290 is transmitted.

A UE can derive a PUSCH transmission power $P_{PUSCH,c}$ (i), in deciBels per milliwatt (dBm), in a serving cell c during subframe i, such as in Equation (1), where for simplicity it is assumed that a UE does not transmit both PUSCH and PUCCH in a same subframe.

$$P_{PUSCH,c}(i) = \min\begin{Bmatrix} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{Bmatrix}[\text{dBm}] \qquad (1)$$

wherein Equation (1):

$P_{CMAX,c}(i)$ is a maximum UE transmit power configured to a UE by higher layer signaling and may depend on a UE power amplifier class.

$M_{PUSCH,c}(i)$ is a PUSCH transmission BW expressed in number of RBs.

$P_{O\_PUSCH,c}(j)$ controls a mean received SINR at serving NodeBs and is the sum of a cell-specific component $P_{O\_NOMINAL\_PUSCH,c}(j)$ and a UE-specific component $P_{O\_UE\_PUSCH,c}(j)$ that are provided to a UE by higher layer signaling for j=0 and j=1.

For j=0 or j=1, $\alpha_c \in \{0, 0.4, 0.5, 0.6, 0.7, 0.8, 0.9, 1\}$ is a 3-bit parameter provided to a UE by higher layer signaling. For j=2, $\alpha_c(j)=1$. Fractional TPC applies for $\alpha_c<1$ as the Path Loss (PL) is not fully compensated. For $\alpha_c=1$, pure CL TPC is provided.

$PL_c$ is a DL PL estimate, in dBs, a UE calculates as $PL_c$=referenceSignalPower−higher layer filtered RSRP, where referenceSignalPower is provided to a UE by higher layer signaling and corresponds to a transmission power of a DL RS a UE measures to determine a PL. RSRP corresponds to a RS Received Power (RSRP) a UE measures using a filter configuration provided by higher layer signaling. A serving cell c for a PL measurement is configured to a UE by higher layer signaling using a parameter pathlossReferenceLinking.

$\Delta_{TF,c}(i)$ either equals 0 or is determined by a spectral efficiency of a PUSCH transmission. Further details are omitted for brevity, as they are not material to the present invention.

$f_c(i)=f_c(i-1)+\delta_{PUSCH,c}$ where $\delta_{PUSCH,c}$ represents a TPC command included in an UL SA scheduling a PUSCH transmission or in a separate PDCCH providing TPC commands to a group of UEs. The TPC command may be accumulative or absolute.

For SRS transmission in a serving cell c during subframe i, an SRS transmission power $P_{SRS,c}$ follows a PUSCH transmission power, such as in Equation (2):

$$P_{SRS,c}(i) = \min\{P_{CMAX,c}(i), P_{SRS\_OFFSET,c}(m) + 10\log_{10}(M_{SRS,c}) + P_{O\_PUSCH,c}(j) + \alpha_c(j) \cdot PL_c + f_c(i)\}[\text{dBm}]. \qquad (2)$$

In Equation 2:

$P_{SRS\_OFFSET,c}(m)$ is a 4-bit parameter configured to a UE by higher layer signaling where for periodic SRS transmission m=0 and for aperiodic SRS transmission m=1.

$M_{SRS,c}$ is a SRS transmission BW expressed in number of RBs.

A UE transmits DMRS or SRS by transmitting a respective Zadoff-Chu (ZC) sequence. For a UL system BW including $N_{RB}^{max,UL}$ RBs, a sequence $r_{u,v}^{(\alpha)}(n)$ can be defined by a Cyclic Shift (CS) $\alpha$ of a base sequence $\bar{r}_{u,v}(n)$ according to $r_{u,v}^{(\alpha)}(n)=e^{j\alpha n}\bar{r}_{u,v}(n)$, $0 \le n < M_{sc}^{RS}$, where $M_{sc}^{RS}=mN_{sc}^{RB}$ is the length of the sequence, $1 \le m \le N_{RB}^{max,UL}$, and $\bar{r}_{u,v}(n)=x_q(n \mod N_{ZC}^{RS})$, where a $q^{th}$ root ZC sequence is defined by $$x_q(m) = \exp\left(\frac{-j\pi q m(m+1)}{N_{ZC}^{RS}}\right),$$

$0 \le m \le N_{ZC}^{RS}-1$ with q given by $q=\lfloor \bar{q}+\frac{1}{2} \rfloor + v \cdot (-1)^{\lfloor 2\bar{q} \rfloor}$ and $\bar{q}$ given by $\bar{q}=N_{ZC}^{RS} \cdot (u+1)/31$. The length $N_{ZC}^{RS}$ of a ZC sequence is given by the largest prime number such that $N_{ZC}^{RS} < M_{sc}^{RS}$. Multiple RS sequences can be defined from a single base sequence through different values of $\alpha$. A UE implicitly determines a ZC sequence to use for DMRS or for SRS transmission through an identity $N_{ID}^{TP}$ of a respective TP.

FIG. 3 is a block diagram illustrating a conventional transmitter block diagram for a ZC sequence.

Referring to FIG. 3, a mapper 320, which performs sub-carrier mapping, maps a ZC sequence of length $M_{sc}^{RS}$ 310 to REs of an assigned transmission BW as the Res are indicated by RE selection unit 330, which controls of transmission BW. The mapping can map the ZC sequence to consecutive REs for a DMRS or to alternate REs for a SRS thereby creating a comb-type spectrum. Subsequently, an IFFT is performed by IFFT unit 340, a CS is applied to the output by CS unit 350, a CP is inserted by CP insertion unit 360, and the resulting signal is filtered by filter 370 for time windowing. Finally, a transmission power ($P_{PUSCH,c}$ for a DMRS or $P_{SRS,c}$ for a SRS) is applied by PA 380 and the resulting RS transmission signal 390 is transmitted.

Improving coverage and cell-edge throughput are key objectives in communication systems. Coordinated Multi-Point transmission/reception (CoMP) is an important technique utilized to achieve these objectives. CoMP operation relies on the fact that when a UE is in a cell-edge region, it may be able to reliably receive signals from a first set of NodeBs (DL CoMP) and reliably transmit signals to a second set NodeBs (UL CoMP). DL CoMP schemes can range from simple schemes involving interference avoidance, such as coordinated scheduling, to more complex schemes requiring accurate and detailed CSI such as joint transmission from multiple NodeBs. UL CoMP schemes can also range from simple schemes where PUSCH scheduling is performed by a single NodeB to more complex schemes where received signal characteristics and generated interference at multiple NodeBs are considered. Herein, NodeBs for DL CoMP are referred to as Transmission Points (TPs) while NodeBs for UL CoMP are referred to as Reception Points (RPs).

FIG. 4 is a diagram illustrating a conventional DL CoMP operation.

Referring to FIG. 4, TP0 410 and TP1 420 are connected through a fiber optic link 430, which enables information exchange with negligible latency. A UE 440 receives a first signal 450 from TP0 410 and a second signal 460 from TP1 420, where the first and second signals 450 and 460 convey same information. Depending on a DL CoMP scheme, a combination of these two signals at a UE may be transparent or non-transparent. FIG. 4 may also be used to describe UL CoMP operation where TPs are instead viewed as RPs, transmissions of signals from TPs are instead viewed as receptions of signals from RPs, and a signal reception from a UE is instead viewed as a signal transmission.

Support of UL CoMP introduces new TPC requirements for PUSCH, PUCCH, and SRS. SRS transmission power control is also relevant for DL CoMP in Time Division duplex (TDD) systems where, due to the DL/UL channel reciprocity, a SRS may be used to obtain more accurate CSI over conventional CSI feedback from a UE based on DL RS measurements.

Therefore, there is a need to define an SRS transmission power control method to support UL CoMP or DL CoMP. There is also a need to decouple a PUSCH TPC process and a SRS TPC process to support UL CoMP or DL CoMP. Finally, there is also a need to provide different TPC commands for a PUSCH transmission power and for a SRS transmission power to support UL CoMP or DL CoMP.

SUMMARY OF THE INVENTION

Accordingly, the present invention has been provided to address at least the aforementioned limitations and problems. An aspect of the present invention provides methods and apparatus for performing SRS transmission power control in support of UL CoMP or DL CoMP and for introducing a separate SRS transmission power control process supporting DL CoMP from a conventional SRS transmission power control process supporting UL CoMP.

According to an aspect of the present invention, a method for transmitting a reference signal from a User Equipment (UE) that receives signaling from at least one transmission point and transmitting signaling to at least one reception point is provided. The method includes transmitting a first reference signal using a sequence determined from an identity of the at least one transmission point and transmitting a second reference signal with a transmission power having an offset with a first maximum value configured by higher layer signaling from the at least one transmission point; and transmitting a first reference signal using a sequence configured to the UE by higher layer signaling from the at least one transmission point, transmitting a second reference signal with a transmission power having an offset with a second maximum value configured by higher layer signaling from the at least one transmission point, wherein the second maximum value is larger than the first maximum value, and the first reference signal and the second reference signal are either identical or non-identical.

According to another aspect of the present invention, a method for transmitting a reference signal from a User Equipment (UE) in response to an indication by a field included in a Downlink Control Information (DCI) format conveyed to the UE in a physical downlink control channel transmitted from at least one transmission point is provided. The method includes transmitting the reference signal with a power determined from a first set of parameters if the DCI format, schedules data transmission to the UE; and transmitting the reference signal with a power determined from a second set of parameters if the DCI format schedules data transmission from the UE.

According to another aspect of the present invention, a method for providing Transmission Power Control (TPC) commands to a User Equipment (UE) for adjusting a transmission power of at least one of a first reference signal and a second reference signal, the TPC commands are provided by a Downlink Control Information (DCI) format that includes Cyclic Redundancy Check (CRC) bits that are scrambled by a Radio Network Temporary Identifier (RNTI) is provided. The method includes adjusting the transmission power of the first reference signal if the UE receives a first TPC command among the TPC commands in a DCI format with CRC scrambled by a first RNTI or if the UE receives a TPC command in first information bits of a DCI format; and adjusting the transmission power of the second reference signal if the UE receives a second TPC command among the TPC commands in a DCI format with CRC scrambled by a second RNTI or if the UE receives a TPC command in second information bits of a DCI format, wherein the first TPC command and the second TPC command are either identical or non-identical.

According to another aspect of the present invention, a User Equipment (UE) for transmitting a reference signal, the UE receiving signaling from at least one transmission point and transmitting signaling to at least one reception point is provided. The UE includes a receiver for receiving higher layer signaling for the at least one transmission point; and a transmitter for transmitting a first reference signal with a sequence determined from an identity of the at least one transmission point and a second reference signal with transmission power having an offset with a first maximum value configured by higher layer signaling from the at least one transmission point and for transmitting a first reference signal with a sequence configured by higher layer signaling from the at least one transmission point a second reference signal with a transmission power having an offset with a second maximum value configured by higher layer signaling from the at least one transmission point wherein the second maximum value is larger than the first maximum value, wherein the first reference signal and the second reference signal are either identical or non-identical.

According to another aspect of the present invention, a User Equipment (UE) for transmitting a reference signal in response to an indication by a field included in a Downlink Control Information (DCI) format conveyed in a physical downlink control channel transmitted from at least one transmission point is provided. The UE includes a receiver for receiving DCI formats in respective physical downlink control channels; and a transmitter for transmitting a reference signal with a power determined from a first set of parameters if a first DCI format among the DCI formats schedules data transmission to the UE apparatus and for transmitting a reference signal with a power determined from a second set of parameters if a second DCI format among the DCI formats schedules data transmission from the UE apparatus, wherein and the first DCI and the second DCI are either identical or non-identical.

According to another aspect of the present invention, a User Equipment (UE) for obtaining Transmission Power Control (TPC) commands and adjusting a transmission power of at least one of a first reference signal and a second reference signal, the TPC commands provided by a Downlink Control Information (DCI) format that includes Cyclic Redundancy Check (CRC) bits that are scrambled by a Radio Network Temporary Identifier (RNTI) is provided. The UE includes a receiver for receiving DCI formats in respective physical downlink control channels; and a transmission power controller for adjusting a transmission power of a first reference signal if a first TPC command among the TPC commands is received in a DCI format with CRC scrambled by a first RNTI or if a second TPC command among the TPC commands is received in first information bits of a DCI format and for adjusting the transmission power of a second reference signal if a TPC command is received in a DCI format with CRC scrambled by a second RNTI or if a TPC command is received in second information bits of a DCI format, wherein the first TPC command and the second TPC command are either identical or non-identical.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE PRESENT INVENTION

Various embodiments of the present invention are described as follows with reference to the accompanying drawings. This present invention may, however, be embodied in many different forms and is not limited to the embodiments set forth herein. Although embodiments of the present invention are described herein with reference to Discrete Fourier Transform (DFT)-spread Orthogonal Frequency Division Multiplexing (OFDM), embodiments of the present invention also are applicable to all Frequency Division Multiplexing (FDM) transmissions in general and to OFDM in particular.

An embodiment of the present invention that considers a SRS transmission power control in support of UL CoMP is described as follows.

For UL CoMP, an SRS transmitted from a UE should be received with sufficient SINR at RPs so that accurate CSI can be obtained and PUSCH transmissions can be scheduled in consideration of a joint SINR at RPs in order to maximize UL throughput. This consideration is not necessarily required for PUSCH (data/UCI/DMRS) transmissions, as the respective signals at RPs can be soft-combined to produce a single signal and, unlike the SRS, the signals do not need to be individually processed at each RP. As additional RPs associated with UL CoMP will typically receive a SRS with a lower SINR than a single RP when there is no UL CoMP, it is beneficial to enable increasing an SINR of an SRS reception so that a smallest SINR observed by a RP is sufficiently high to obtain accurate CSI from the SRS.

Figure 1:
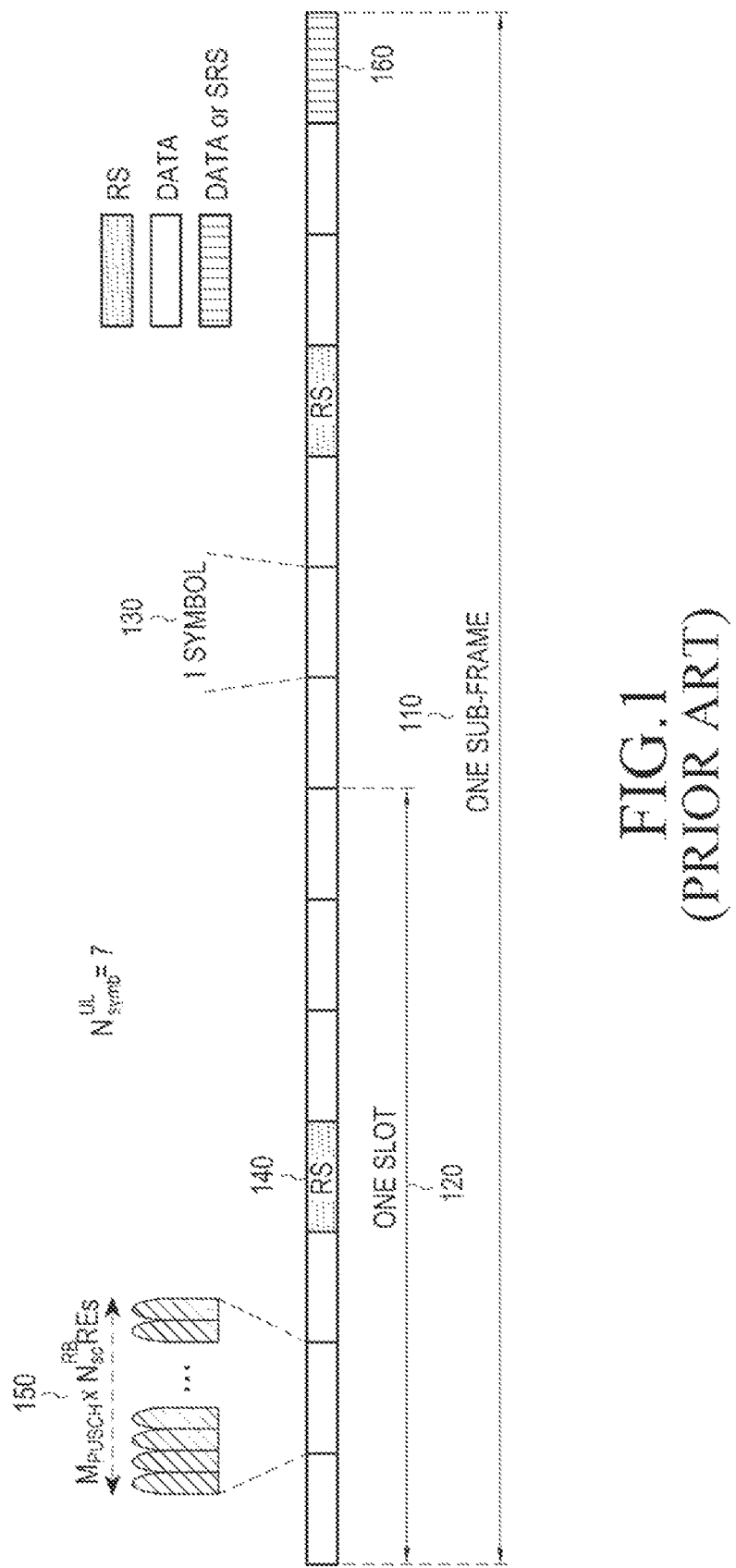
FIG. 1 is a diagram illustrating a conventional PUSCH structure over a Transmission Time Interval.
Figure 2:
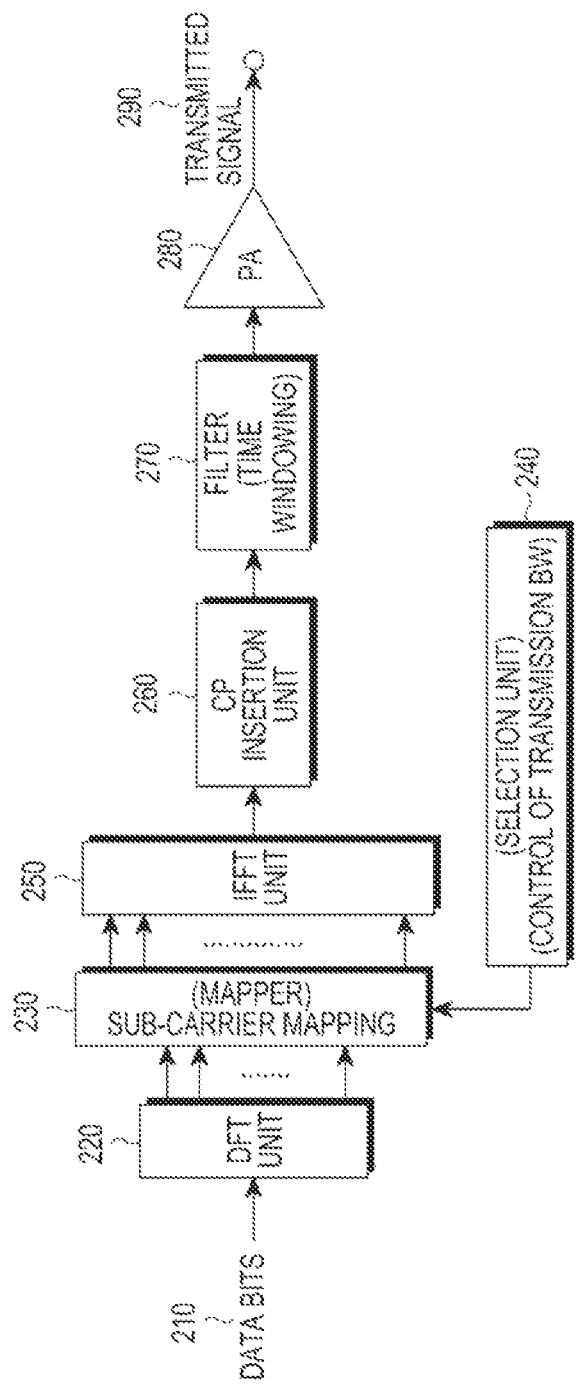
FIG. 2 is a block diagram illustrating a conventional transmitter for data in a PUSCH.
Figure 3:
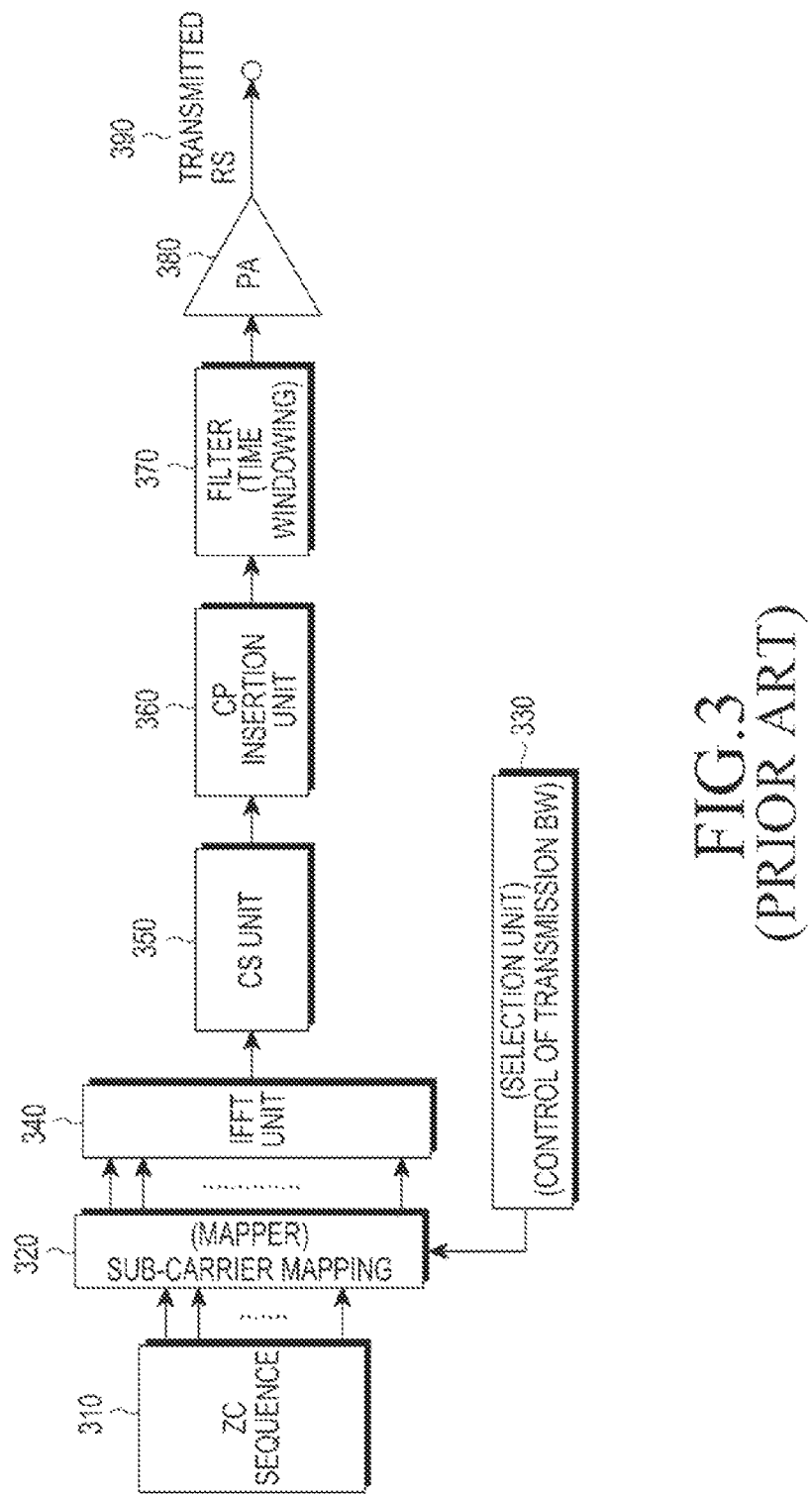
FIG. 3 is a block diagram illustrating a conventional transmitter for a ZC sequence.
Figure 4:
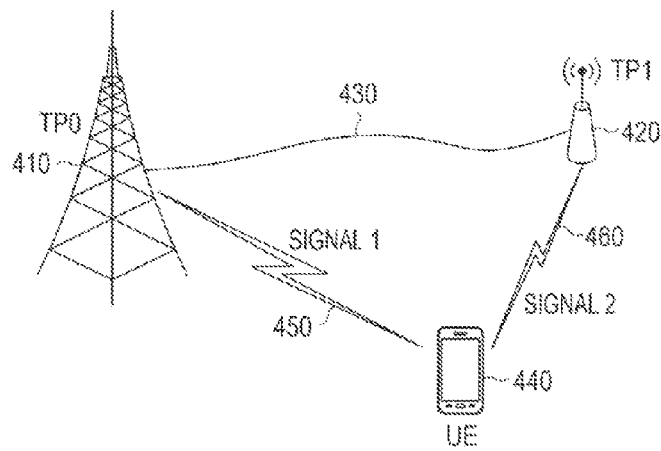
FIG. 4 is a diagram illustrating a conventional DL CoMP operation.
Figure 5:
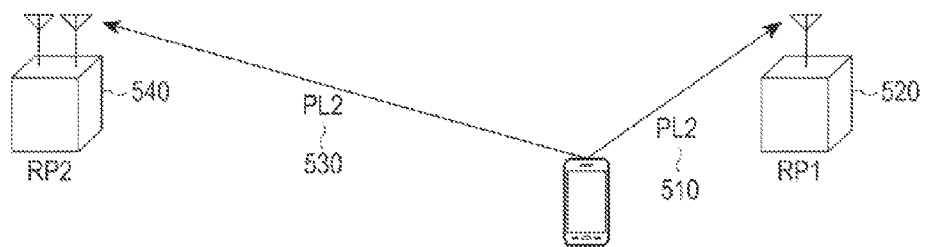
FIG. 5 is a diagram illustrating two different PLs for a signal at two different RPs according to an embodiment of the present invention.

FIG. 5 is a diagram illustrating two different PLs for a signal at two different RPs according to an embodiment of the present invention.

Referring to FIG. 5, in order to provide accurate CSI, an SRS transmission power may account for the PL, PL1 510, to RP1 520, which for single RP operation would be the selected RP based on the criterion of smallest PL experienced by a UE, as well as account for the larger PL, PL2 530, to RP2 540. The RPs may be assumed to be connected through a fast link such as a fiber optics link (not shown). Therefore, a larger PL for a set of UL CoMP RPs may be used for SRS transmission, as compared to when there is no UL CoMP. Conversely, for data/UCI/DMRS transmission in a PUSCH, a transmission power may account only the smallest PL (corresponding to transmissions to RP1) in order to avoid creating additional interference.

The additional interference generated from transmitting an SRS with additional power to support UL CoMP may not be a detrimental factor. For example, a network can configure a same subframe to be used for SRS transmissions from UEs participating in UL CoMP for a set of RPs and such UEs can be further assigned orthogonal SRS resources. For example, orthogonal SRS multiplexing in a same subframe (last symbol) for all RPs can be achieved either by using different combs or by using different cyclic shifts when SRS transmissions have a same BW size and BW position and use a same ZC sequence that can be provided to each UE through higher layer signaling (instead of being implicitly derived by the TP identity as for a conventional single TP or single RP operation). A ZC sequence used by a UE to transmit SRS may be different than a ZC sequence used by a UE to transmit PUCCH or DMRS associated with a PUSCH, which can also be provided to each UE through higher layer signaling (instead of being implicitly derived by the TP identity as for a conventional single TP or single RP operation). For PUSCH (data/UCI/DMRS) transmissions, such orthogonal multiplexing is not possible, as orthogonal multiplexing cannot be achieved (especially for data/UCI transmissions) without reserving a respective BW set to be unavailable for PUSCH transmissions from other UEs.

Based on Equation (2), in order to enable enhanced SRS TPC for a UE participating in UL CoMP, parameters that may be modified include $P_{SRS\_OFFSET,c}(m)$, $\alpha_c(j)$, $PL_c$, and $f_c(i)$ for periodic and aperiodic SRS transmissions.

In order to compensate for the larger PL, an SRS transmission from a UE to an RP may experience, other than the RP for which the UE measures a PL, $PL_c$, the UE may be signaled by higher layers to apply a PL offset, $\Delta PL_c^{SRS}$, to its SRS transmission. This signaling avoids requiring a UE to measure a PL for each RP and provides a network with the flexibility to assign a desired PL compensation $\Delta PL_c^{SRS}$. A network may determine $\Delta PL_c^{SRS}$ based on a received SRS SINR at different RPs.

Due to the assignment of orthogonal resources for SRS transmissions from UEs having a same set of RPs, fractional PL compensation may not be necessary in order to control inter-RP interference, and $\alpha_c(j)$ may be independently assigned by higher layer signaling for SRS and for PUSCH (data/UCI/DMRS) transmissions. A respective parameter for SRS transmissions is denoted by $\alpha_{SRS,c}(j)$ and it's a value of the parameter can be selected from the same set of values as for $\alpha_c(j)$. For example, while $\alpha_{SRS,c}(j)=1$ while $\alpha_c(j)<1$.

Assuming that RPs for SRS are same as the RPs for data/UCI/DMRS, a decoupling of a same TPC command that is applicable to both SRS and data/UCI/DMRS transmissions in order to support UL CoMP may not be necessary. However, for SRS transmission power control in support of DL CoMP in TDD systems, separate TPC commands for SRS transmissions and for PUSCH transmissions may be necessary, thereby requiring the introduction of a separate (enhanced) SRS TPC process other than the conventional process that must be associated with a respective PUSCH. A TPC command for an enhanced SRS transmission (not applicable to a PUSCH transmission) is denoted as $\delta_{SRS,c}$ and a respective power control loop based on a TPC command for an enhanced SRS transmission is $f_{SRS,c}(i)=f_{SRS,c}(i-1)+\delta_{SRS,c}$ (which is separate from the power control loop based on a TPC command for a PUSCH transmission as it was previously described).

Mechanisms for a UE to obtain a TPC command, $\delta_{PUSCH,c}$, for a PUSCH transmission and a separate TPC command, $\delta_{SRS,c}$, for an enhanced SRS transmission according to embodiments of the present invention are subsequently described herein. For an enhanced SRS TPC process, a UE may use either $\delta_{SRS,c}$ or both $\delta_{SRS,c}$ and $\delta_{PUSCH,c}$.

In order to more flexibly accommodate a larger SRS transmission power when there are multiple RPs, larger values for the parameter $P_{SRS\_OFFSET,c}(m)$ may be supported and the respective parameter is denoted by $P_{SRS\_OFFSET,c}^{extend}(m)$.

With all the above modifications, a SRS transmission power $P_{SRS,c}$ can be expressed as in Equation (3):

$$P_{SRS,c}(i) = \min\{P_{CMAX,c}(i), P_{SRS\_OFFSET,c}^{extend}(m) + 10 \log_{10}(M_{SRS,c}) + P_{O\_PUSCH,c}(j) + \alpha_{SRS,c}(j) \cdot (PL_c + \Delta PL_c^{SRS}) + f_{SRS,c}(i)\}[\text{dBm}] \quad (3)$$

Figure 6:
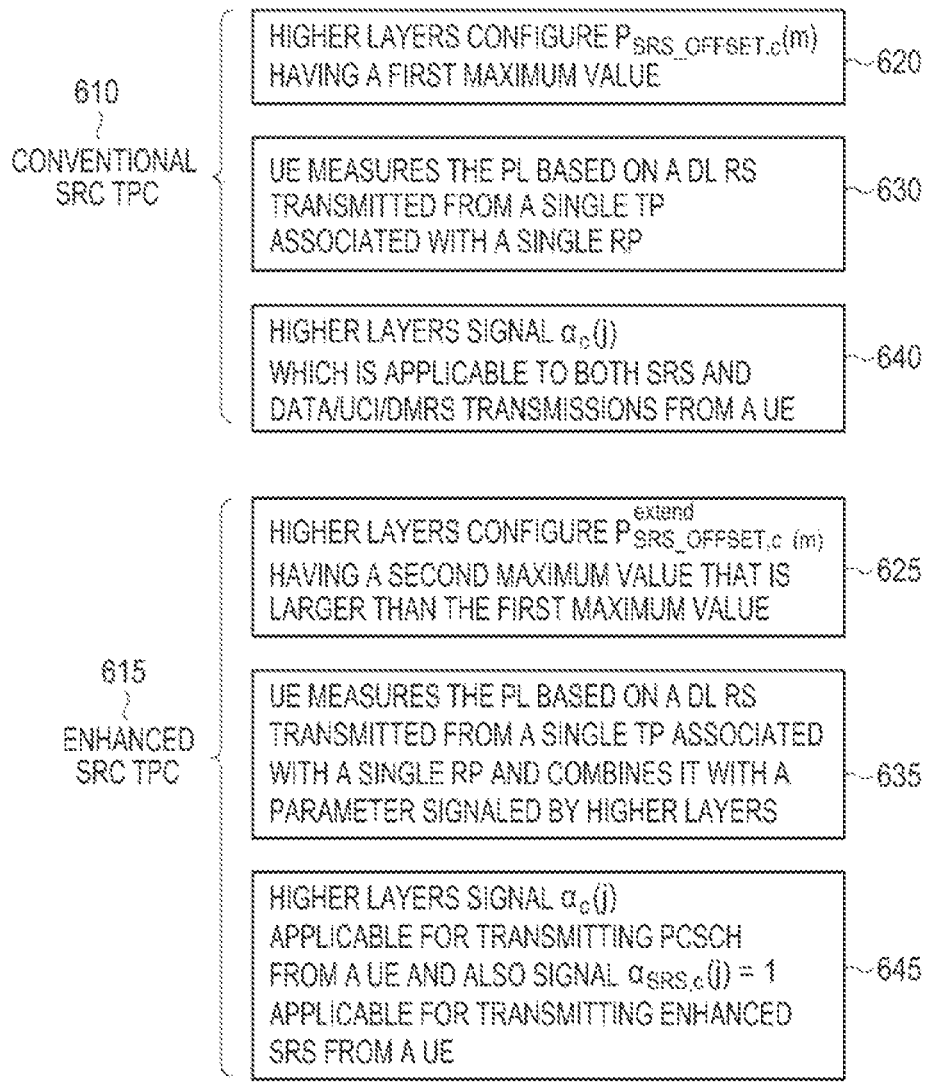
FIG. 6 is a diagram illustrating a comparison between a conventional SRS TPC and an enhanced SRS TPC according to an embodiment of the present invention.

FIG. 6 is a diagram illustrating a comparison between a conventional SRS TPC and an enhanced SRS TPC according to an embodiment of the present invention.

Referring to FIG. 6, for a conventional SRS TPC 610, such as an SRS TPC operating according to Equation (2), a UE is signaled by higher layers a $P_{SRS\_OFFSET,c}(m)$ value 620 having a first maximum value. For an enhanced SRS TPC 615, such as an SRS TPC operating according to Equation (3), a UE is signaled by higher layers a $P_{SRS\_OFFSET,c}^{extend}(m)$ value 625 having a second maximum value that is larger than the first maximum value. Therefore, $P_{SRS\_OFFSET,c}^{extend}(m)$ has a greater range than the $P_{SRS\_OFFSET,c}(m)$.

For a conventional SRS TPC 610, a UE measures a PL 630 based on a DL RS transmitted from a TP associated with a RP of SRS reception. For an enhanced SRS TPC 615, a UE measures a PL based on a DL RS transmitted from a TP associated with an RP of SRS reception and combines the measured PL with a parameter $\Delta PL_c^{SRS}$ signaled by higher layers 635. Finally, for a conventional SRS TPC 610, a UE is signaled a single parameter $\alpha_c(j)$ 640, which the UE applies for PL compensation for both data/UCI/DMRS and conventional SRS transmissions. Meanwhile, for an enhanced SRS TPC 615, a UE is signaled a first parameter $\alpha_c(j)$, which the UE applies for PL compensation for TPC of data/UCI/DMRS transmissions and a second parameter $\alpha_{SRS,c}(j)=1$ which it applies for TPC of enhanced SRS transmission 645. A UE does not simultaneously transmit a SRS with conventional TPC and a SRS with enhanced TPC in a same cell.

Another embodiment of the present invention considers an SRS TPC in support of DL CoMP in TDD systems where multiple TPs need to simultaneously receive SRS to estimate a respective CSI. These TPs may be different than the RP(s).

Figure 7:
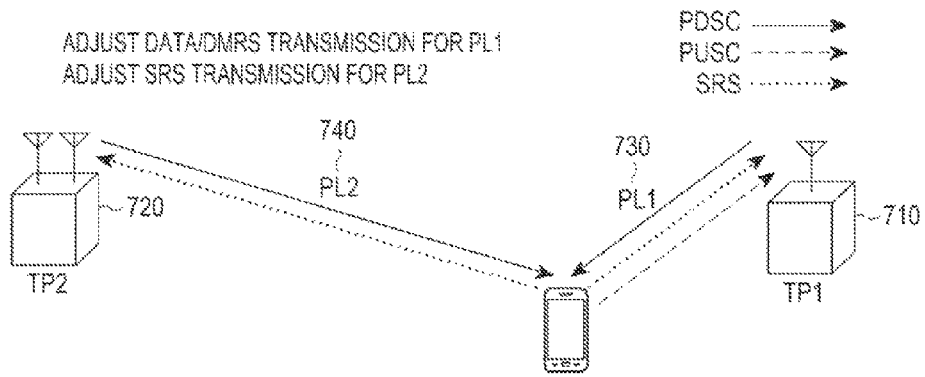
FIG. 7 is a diagram illustrating a DL CoMP operation according to an embodiment of the present invention.

FIG. 7 is a diagram illustrating a DL CoMP operation according to an embodiment of the present invention.

Referring to FIG. 7, a UE receives DL transmissions from two TPs, TP1 710 and TP2 720 while, due to the smaller transmission power of the UE, UL reception from the UE is only at 1 RP (TP1 710 also serves as the RP). The transmission from each TP is associated with a different PL, PL1 730 and PL2 740, respectively.

Conventional SRS TPC links an SRS transmission power to a PL, $PL_c$, that a UE measures based on an RS transmitted from a TP of serving cell c. This TP is assumed to be associated with a RP of serving cell c. In general, such TP/RP collocation may not always exist, particularly in heterogeneous networks that employ high transmission power nodes and low transmission power nodes. Then, due to the imbalance of transmission powers from different nodes, a UE connect to a high transmission power node in the DL (larger RSRP), as well as connect to a low transmission power node in the UL (smaller PL) as the geographical border between the high and low power nodes is closer to the low power node in terms of RSRP and closer to the high power node in terms of PL.

For PUSCH TPC, when a UE is connected to a different node in the DL than in the UL, the UE can be signaled by higher layers a PL offset parameter, $\Delta PL_c^{PUSCH}$, and compute a PL as $PL_c+\Delta PL_c^{PUSCH}$. A PL offset parameter for a PUSCH transmission $\Delta PL_c^{PUSCH}$ must be different than a PL offset parameter for an enhanced SRS transmission $\Delta PL_c^{SRS}$, as the PL offset parameter for the PUSCH transmission may need to have a negative value while the PL offset parameter for the enhanced SRS transmission may need to have a zero or a positive value. In FIG. 5, although a PL for computing a PUSCH transmission power may be based for reception only at the RP, the PL for computing an enhanced SRS transmission power should consider reception at both TPs and use $PL_c$ (or $PL_c+\Delta PL_c^{SRS}$) instead of $PL_c+\Delta PL_c^{PUSCH}$.

Another issue related to the use of SRS to obtain CSI for DL CoMP is the application of a same TPC command $\delta_{PUSCH,c}$ for SRS transmission and for data/UCI/DMRS transmission in a PUSCH (as described in Equation (1) and Equation (2)). For conventional operations, TPC commands for SRS transmissions are always linked to the commands for data/UCI/DMRS transmission in a PUSCH and are provided only through UL SAs or through PDCCH providing TPC commands for PUSCH transmissions to a group of UEs. As accurate TP association and accurate CSI are key components for achieving throughput gains from DL CoMP, and as the channel between a UE and the different TPs may be independent than the channel between a UE and different RP(s), decoupling the TPC commands used for enhanced SRS transmission and for a PUSCH transmission is generally necessary.

A first approach to providing a separate TPC command $\delta_{SRS,c}$ for an enhanced SRS transmission according to an embodiment of the present invention, in contrast to the TPC command $\delta_{PUSCH,c}$ conventionally used for both SRS and for data/UCI/DMRS transmissions in a PUSCH, is to allow for TPC commands for enhanced SRS transmissions to be included in DL SAs (as TPC commands in UL SAs are associated with conventional PUSCH/SRS TPC). In particular, a TPC command field can be included in DL SAs scheduling PDSCH transmissions from TPs to a UE in order for the UE to adjust an enhanced SRS transmission power (but not a PUSCH transmission power).

A second approach to providing a separate TPC command $\delta_{SRS,c}$ for an enhanced SRS transmission according to an embodiment of the present invention, in contrast to the TPC command $\delta_{PUSCH,c}$ conventionally used for both SRS and data/UCI/DMRS transmissions in a PUSCH, is to provide TPC commands to a group of UEs using a RNTI, TPC-SRS-RNTI, to scramble the CRC in a PDCCH conveying TPC commands for enhanced SRS transmission to a group of UEs that is different from the TPC-PUSCH-RNTI. This allows a UE to distinguish the applicability of a TPC command either for an enhanced SRS transmission (TPC-SRS-RNTI) or for a PUSCH transmission (TPC-PUSCH-RNTI).

A third approach to providing a separate TPC command $\delta_{SRS,c}$ for an enhanced SRS transmission according to an embodiment of the present invention, in contrast to the TPC command $\delta_{PUSCH,c}$ conventionally used for both SRS and for data/UCI/DMRS transmissions in a PUSCH, is to use higher layer signaling to inform a UE that, for an existing PDCCH providing TPC commands using for example a TPC-PUSCH-RNTI (or a TPC-PUCCH-RNTI) to scramble its CRC, enhanced SRS TPC commands are provided by one set of bits while PUSCH (or PUCCH) TPC commands are provided by another set of bits.

Although one of the primary motivations for decoupling a TPC command $\delta_{SRS,c}$ for an enhanced SRS transmission from a TPC command $\delta_{PUSCH,c}$ for a PUSCH transmission is to support DL CoMP, this decoupling can also provide a more generic functionality that is provided to all UEs (especially if UE-transparent DL CoMP operation is used). For example, for aperiodic SRS triggering by a DL SA, the conventional method for providing a TPC command through a respective UL SA is not applicable, and the only possibility for adjusting the transmission power of the aperiodic SRS is to include a respective TPC command in a DL SA, either by an explicit field in the DL SA or by a respective field in the configuration of parameters for the aperiodic SRS transmission.

Figure 8:
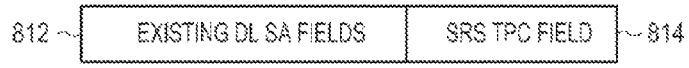
FIG. 8 is a diagram illustrating alternatives for assigning a TPC command $\delta_{SRS,c}$ for an enhanced SRS transmission according to an embodiment of the present invention.
Figure 8:
Figure 8:

FIG. 8 is a diagram illustrating alternatives for assigning a TPC command $\delta_{SRS,c}$ for an enhanced SRS transmission according to an embodiment of the present invention.

Referring to FIG. 8, $\delta_{SRS,c}$ may be assigned either by a DL SA, or by a PDCCH with CRC scrambled by a TPC-SRS-RNTI, or by a PDCCH with CRC scrambled by TPC-PUSCH-RNTI (or by TPC-PUCCH-RNTI). In a first approach to providing a TPC command for an enhanced SRS transmission that is decoupled from the TPC command for a PUSCH transmission, a TPC field is included in a DL SA 810. The DL SA according to an embodiment of the present invention includes conventional fields, such existing DL SA fields 812, and also includes a SRS TPC field 814. In an alternative approach according to another embodiment of the present invention, a PDCCH with CRC scrambled by a TPC-SRS-RNTI is exclusively dedicated to providing TPC commands for enhanced SRS transmissions 820 from a group of UEs and each individual field 822, 824, 826, provides a TPC command for an enhanced SRS transmission by a respective UE. A UE is configured by higher layers to monitor PDCCH with a specific TPC-SRS-RNTI and a specific field providing a TPC command for an enhanced SRS transmission. In another approach according to an embodiment of the present invention, an existing PDCCH with CRC scrambled with a TPC-PUSCH-RNTI (or with a TPC-PUCCH-RNTI) is used to also provide TPC commands for enhanced SRS transmissions 830. In addition to conventional TPC commands for PUSCH (or PUCCH) transmissions by respective UEs, 832, 836, a PDCCH with CRC scrambled with a TPC-PUSCH-RNTI (or with a TPC-PUCCH-RNTI) also provides TPC commands for enhanced SRS transmissions 834. A UE is configured according to higher layers to monitor a specific field of such PDCCH for a TPC command adjusting its enhanced SRS transmission power. In all previous approaches, the TPC commands can be represented by 2 bits, for example.

Figure 9:
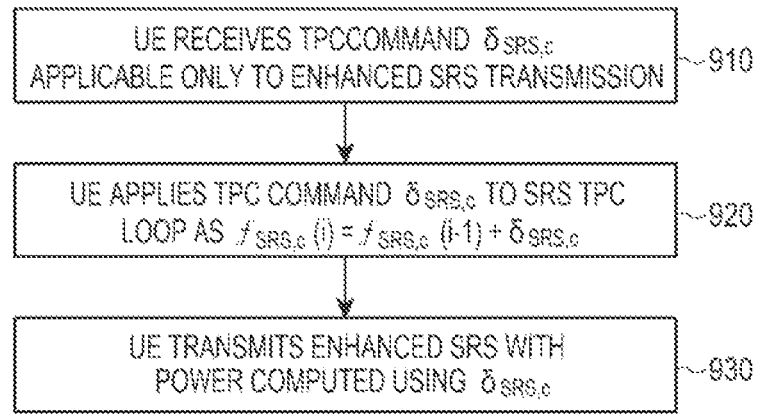
FIG. 9 is a diagram illustrating a process for a UE to determine an enhanced SRS transmission power according to an embodiment of the present invention.

FIG. 9 is a diagram illustrating a process for a UE to determine an enhanced SRS transmission power according to an embodiment of the present invention.

Referring to FIG. 9, $\delta_{SRS,c}$ exclusively applies for an enhanced SRS transmission and is received by a UE either in a DL SA, or in a PDCCH with CRC scrambled by a TPC-SRS-RNTI, or in a PDCCH with CRC scrambled by TPC-PUSCH-RNTI (or by TPC-PUCCH-RNTI). A UE first receives a TPC command $\delta_{SRS,c}$ 910 in UL subframe i. A UE does not consider this TPC command as applicable for a PUSCH or for a PUCCH transmission. Subsequently, a UE incorporates the TPC command $\delta_{SRS,c}$ for enhanced SRS transmission in the respective power control loop 920 as $f_{SRS,c}(i)=f_{SRS,c}(i-1)+\delta_{SRS,c}$ (that is independent from the conventional one used for PUSCH transmissions). Finally, a UE transmits an enhanced SRS with a power adjusted based on the received TPC command $\delta_{SRS,c}$ 930, for example as in Equation (3).

The $\delta_{SRS,c}$ may be applicable for both types of SRS (periodic and aperiodic) or only for one SRS type. For example, if $\delta_{SRS,c}$ is received in a DL SA activating aperiodic SRS transmission it may apply only for the aperiodic SRS while if it is received in a PDCCH with CRC scrambled by a TPC-SRS-RNTI it may apply only for the periodic SRS.

Figure 10:
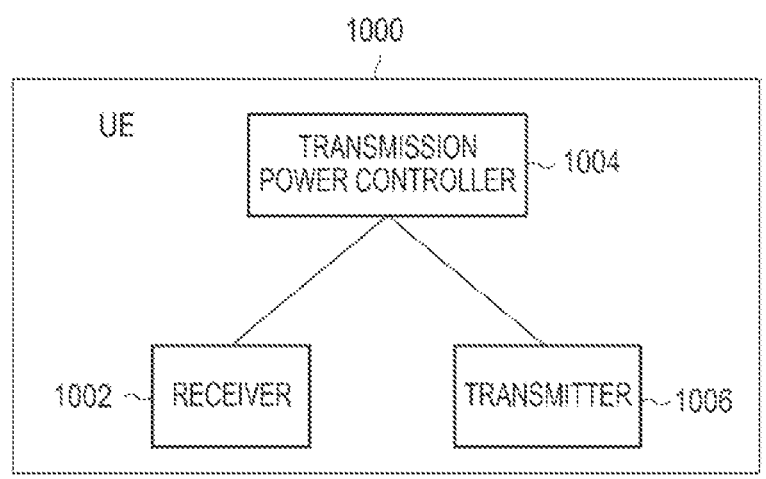
FIG. 10 is a schematic diagram illustrating a structure for a UE according to an embodiment of the present invention.

FIG. 10 is a schematic diagram illustrating a structure for a UE according to an embodiment of the present invention. In the example according to FIG. 10, the UE receives signaling from at least one transmission point and transmitting signaling to at least one reception point.

Referring to FIG. 10, UE 1000 includes a receiver 1002, a transmission power controller 1004, and a transmitter 1006.

Operations performed by components of the UE 1000 according to a first example according to an embodiment of the present invention are described as follows. The receiver 1002 receives higher layer signaling for the at least one transmission point.

The transmitter 1006 transmits a first reference signal with a sequence determined from an identity of the at least one transmission point and a second reference signal with a transmission power having an offset with a first maximum value configured by higher layer signaling from the at least one transmission point, and the transmitter 1006 transmits a second reference signal with a transmission power having an offset with a second maximum value configured by higher layer signaling from the at least one transmission point wherein the second maximum value is larger than the first maximum value. The first reference signal is one of a demodulation reference signal, which is associated either with a physical uplink shared channel or with a physical uplink control channel, and a sounding reference signal. The second reference signal is defined as a sounding reference signal and the transmission power offset is relative to a transmission power of a signal other than sounding reference signals, in a physical uplink shared channel. The sounding reference signals may be transmitted periodically or dynamically.

The transmission power controller 1004 applies a first compensation factor to a first path loss estimate for determining a first transmission power for a sounding reference signal having a power offset with a first configured maximum value and a second compensation factor to a second path loss estimate for determining a second transmission power for a sounding reference signal having a power offset with a second configured maximum value. The sequence is a Zadoff-Chu sequence.

Operations performed by components of the UE 1000 according to another example according to embodiment of the present invention are described as follows. The UE 1000 transmits a reference signal in response to an indication by a field included in a Downlink Control Information (DCI) format conveyed in a physical downlink control channel transmitted from at least one transmission point. In particular, the receiver 1002 receives DCI formats in respective physical downlink control channels. The transmitter 1006 transmits a reference signal with a power determined from a first set of parameters if a first DCI format among the DCI formats schedules data transmission to the UE apparatus and transmits a reference signal with a power determined from a second set of parameters if a second DCI format among the DCI formats schedules data transmission from the UE apparatus, wherein and the first DCI and the second DCI may be either identical or non-identical. Each of the first and second sets of parameters includes a power control command, a power control command included in the first set and a power control command included in the second set may be either identical or non-identical. Each of the first and second sets of parameters includes a power offset. A power offset included in the first set and a power offset included in the second set may be either identical or non-identical.

The transmission power controller 1004 controls the power determined from the first set not associated with the power for transmission of signals in a physical uplink shared channel and the power determined from the second set associated with the power for transmission of signals in a physical uplink shared channel.

Operations performed by components of the UE 1000 according to further another example according to an embodiment of the present invention are described as follows. The UE 1000 obtains Transmission Power Control (TPC) commands and adjusts a transmission power of at least one of a first reference signal and a second reference signal, where the TPC commands are provided by a Downlink Control Information (DCI) format that includes Cyclic Redundancy Check (CRC) bits that are scrambled by a Radio Network Temporary Identifier (RNTI).

The receiver 1002 receives DCI formats in respective physical downlink control channels. The transmission power controller 1004 adjusts a transmission power of a first reference signal if a first TPC command among the TPC commands is received in a DCI format with CRC scrambled by a first RNTI or if a second TPC command among the TPC commands is received in first information bits of a DCI format. The transmission power controller 1004 also adjusts the transmission power of a second reference signal if a TPC command is received in a DCI format with CRC scrambled by a second RNTI or if a TPC command is received in second information bits of a DCI format. The first TPC command and the second TPC command may be either identical or non-identical.

For example, the reference signal may be a Sounding Reference Signal (SRS), while the first RNTI is a TPC-PUSCH-RNTI and the TPC command in a respective DCI format that also adjusts a transmission power of data signals and a transmission power of other reference signals that the UE apparatus transmits in a Physical Uplink Shared CHannel (PUSCH). The second RNTI is a TPC-SRS-RNTI and the TPC command in a respective DCI format that is discarded by the UE apparatus as a result of adjusting a PUSCH transmission power.

According to another example, the reference signal may be a Sounding Reference Signal (SRS), while the first information bits also adjust a transmission power of data signals and of other reference signals that the UE apparatus transmits in a Physical Uplink Shared CHannel (PUSCH), and the second information bits are discarded by the UE apparatus as a result of adjusting a PUSCH transmission power.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A method for transmitting signals from a user equipment (UE) that receives signaling from at least one transmission point and transmits signaling to at least one reception point, the method comprising the steps of:
   transmitting a first reference signal using a sequence determined from an identity of the at least one transmission point;
   transmitting a second reference signal with a first transmission power having an offset with a first maximum value configured using first higher layer signaling received from the at least one transmission point;
   transmitting a third reference signal using a sequence configured to the UE using second higher layer signaling received from the at least one transmission point; and
   transmitting a fourth reference signal with a second transmission power having an offset with a second maximum value configured using third higher layer signaling received from the at least one transmission point,
   wherein the second maximum value is larger than the first maximum value.

2. The method of claim 1, wherein each of the first reference signal and the third reference signal is one of a demodulation reference signal that is associated with a physical uplink shared channel or with a physical uplink control channel, and a sounding reference signal, and
   wherein each of the second reference signal and the fourth reference signal is a sounding reference signal, and
   wherein the transmission power offset of the second reference signal is relative to a transmission power of a signal, other than sounding reference signals, in the physical uplink shared channel.

3. The method of claim 2, wherein the sounding reference signal is transmitted periodically or dynamically.

4. The method of claim 1, further comprising:
   determining the first transmission power for the second reference signal by applying a first compensation factor to a first path loss estimate, the second reference signal including a sounding reference signal; and
   determining the second transmission power for the fourth reference signal by applying a second compensation factor to a second path loss estimate, the fourth reference signal including a sounding reference signal.

5. The method of claim 1, wherein the sequence configured to the UE is a Zadoff-Chu sequence.

6. The method of claim 1, wherein at least one among the first reference signal, second reference signal, third reference signal, and fourth reference signal is a sounding reference signal, the transmission power of the sounding reference signal is adjusted by a transmission power control (TPC) command provided by a downlink control information (DCI) format that includes cyclic redundancy check (CRC) bits that are scrambled by a radio network temporary identifier (RNTI).

7. A method for transmitting signals from a user equipment (UE) in response to an indication by a field included in a downlink control information (DCI) format conveyed to the UE in a physical downlink control channel transmitted from at least one transmission point, the method comprising the steps of:
   transmitting a sounding reference signal with a first power determined from a first set of parameters, if the DCI format schedules data transmission to the UE; and
   transmitting signals on a physical uplink shared channel with a second power determined from a second set of parameters, if the DCI format schedules data transmission from the UE.

8. The method of claim 7, wherein each of the first and second sets of parameters includes a power control command.

9. The method of claim 7, wherein each of the first and second sets of parameters includes a power offset.

10. The method of claim 7, wherein the sounding reference signal reports channel state information (CSI) of the UE.

11. A user equipment (UE) for transmitting signals, the UE receiving signaling from at least one transmission point and transmitting signaling to at least one reception point, the UE comprising:

a receiver configured to receive higher layer signaling from the at least one transmission point; and a transmitter configured to:
- transmit a first reference signal using a sequence determined from an identity of the at least one transmission point,
- transmit a second reference signal with a first transmission power having an offset with a first maximum value configured using first higher layer signaling received from the at least one transmission point,
- transmit a third reference signal using a sequence configured by second higher layer signaling received from the at least one transmission point, and
- transmit a fourth reference signal with a second transmission power having an offset with a second maximum value configured using third higher layer signaling received from the at least one transmission point, wherein the second maximum value is larger than the first maximum value.

12. The UE of claim 11, wherein each of the first reference signal and the third reference signal is one of a demodulation reference signal that is associated with a physical uplink shared channel or with a physical uplink control channel, and a sounding reference signal, and wherein each of the second reference signal and the fourth reference signal is a sounding reference signal and the transmission power offset of the second reference signal is relative to a transmission power of a signal, other than sounding reference signals, in the physical uplink shared channel.

13. The UE of claim 12, wherein the sounding reference signals are transmitted periodically or dynamically.

14. The UE of claim 11, further comprising:
a controller configured to determine the first transmission power for the second reference signal by applying a first compensation factor to a first path loss estimate, and
to determine the second transmission power for the fourth reference signal by applying a second compensation factor to a second path loss estimate, the fourth reference signal including a sounding reference signal.

15. The UE of claim 11, wherein the sequence configured by the second higher layer signaling is a Zadoff-Chu sequence.

16. The UE of claim 11, wherein at least one among the first reference signal, second reference signal, third reference signal, and fourth reference signal is a sounding reference signal, the transmission power of the sounding reference signal is adjusted by a transmission power control (TPC) command provided by a downlink control information (DCI) format that includes cyclic redundancy check (CRC) bits that are scrambled by a radio network temporary identifier (RNTI).

17. A user equipment (UE) for transmitting signals in response to an indication by a field included in a downlink control information (DCI) format conveyed in a physical downlink control channel transmitted from at least one transmission point, the UE comprising:

a receiver configured to receive DCI formats in respective physical downlink control channels; and a transmitter configured to transmit a sounding reference signal with a first power determined from a first set of parameters, if a first DCI format from among the DCI formats schedules data transmission to the UE apparatus, and to transmit signals on a physical uplink shared channel with a second power determined from a second set of parameters, if a second DCI format from among the DCI formats schedules data transmission from the UE.

18. The UE of claim 17, wherein each of the first and second sets of parameters includes a power control command.

19. The UE of claim 17, wherein each of the first and second sets of parameters includes a power offset.

20. The UE of claim 17, wherein the sounding reference signal reports channel state information (CSI) of the UE.

\* \* \* \* \*